United States Patent [19]
Yamagata

[11] Patent Number: 4,746,872
[45] Date of Patent: May 24, 1988

[54] DIFFERENTIAL PHASE SHIFT KEYING DEMODULATOR

[75] Inventor: Shigeo Yamagata, Kanagawa, Japan

[73] Assignee: Canon Kabushiki Kaisha, Tokyo, Japan

[21] Appl. No.: 865,065

[22] Filed: May 19, 1988

[30] Foreign Application Priority Data

May 24, 1985 [JP] Japan .................................. 60-111471

[51] Int. Cl.$^4$ ............................................ H04L 27/22
[52] U.S. Cl. ...................................... 329/50; 329/104; 329/122; 329/137; 329/145; 375/82; 375/84; 375/94
[58] Field of Search ................. 329/50, 104, 105, 107, 329/110, 122, 137, 145; 375/86, 87, 56, 80, 82, 83, 84, 94, 85

[56] References Cited

U.S. PATENT DOCUMENTS

| | | | |
|---|---|---|---|
| 3,938,052 | 2/1976 | Glasson et al. | 329/104 |
| 4,336,613 | 6/1982 | Hewes | 375/80 X |
| 4,628,271 | 12/1986 | Takayama | 329/50 |

Primary Examiner—Eugene R. LaRoche
Assistant Examiner—David Mis
Attorney, Agent, or Firm—Robin, Blecker & Daley

[57] ABSTRACT

A demodulator delays a signal modulated by differential phase shift keying, compares the delayed modulated signal with a modulated signal which is not delayed, and samples the result of comparison a plurality of times for the delay time.

18 Claims, 4 Drawing Sheets

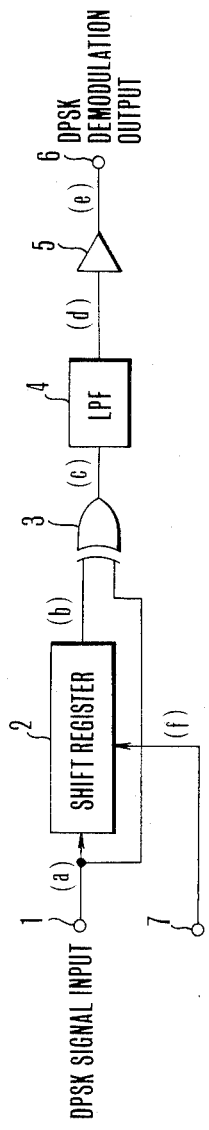
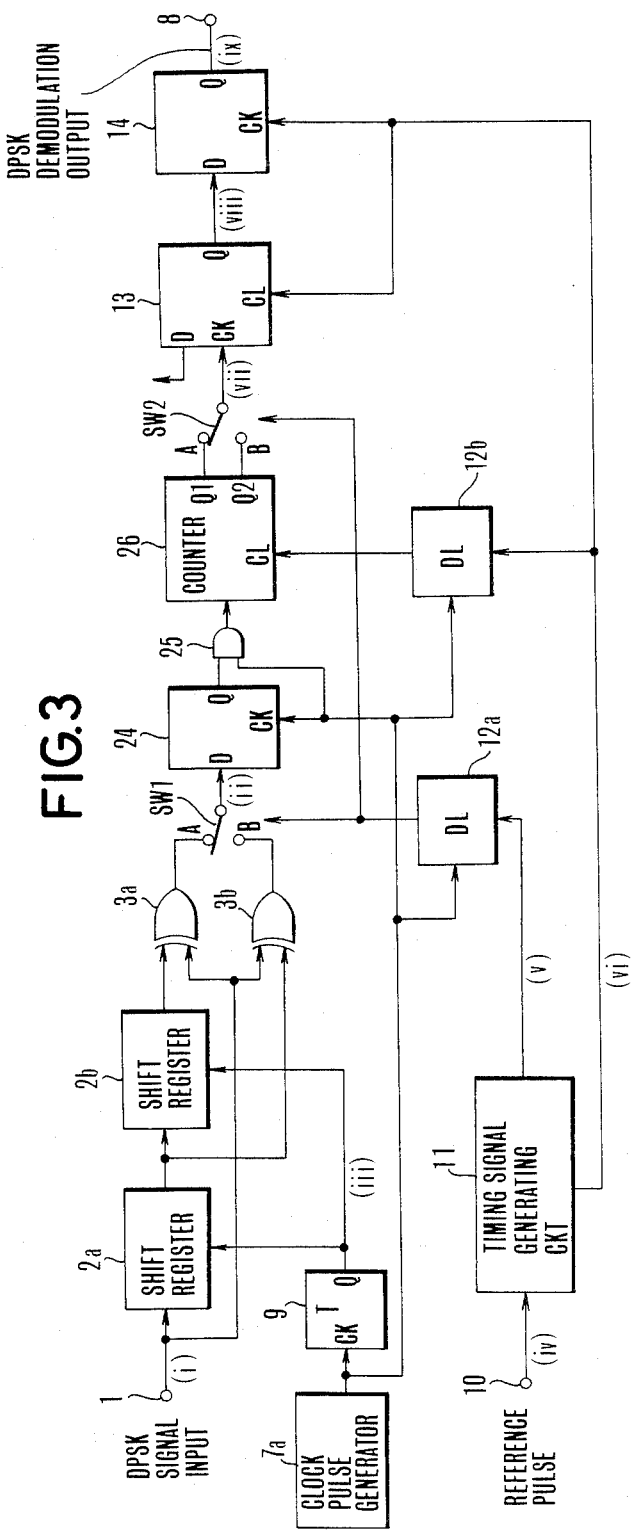

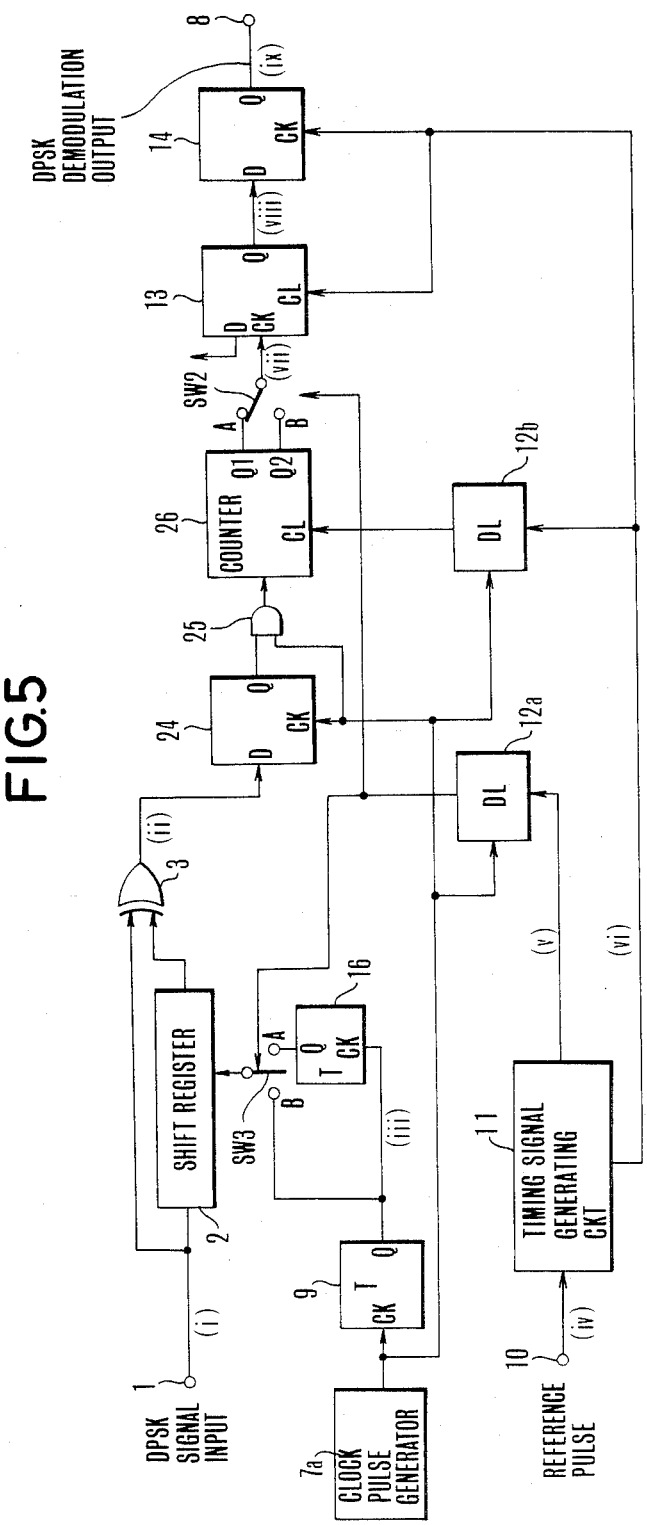

DIFFERENTIAL PHASE SHIFT KEYING DEMODULATOR

BACKGROUND OF THE INVENTION

1. Field of the Invention

This invention relates to a demodulator which demodulates a signal modulated by differential phase shift keying.

2. Description of the Related Art

FIG. 1 of the accompanying drawings shows an example of the conventional demodulator arranged to demodulate a two-phase signal modulated by differential phase shift keying (hereinafter referred to as DPSK modulated signal). FIG. 2 is a timing chart showing the wave forms of signals obtained at various parts of FIG. 1. Referring to FIG. 1, the illustration includes an input terminal 1 arranged to receive the DPSK modulated signal; a shift register 2; an exclusive OR circuit (hereinafter referred to as EXOR) 3; a low-pass filter (hereinafter referred to as LPF) 4; a buffer amplifier 5; and an output terminal 6 arranged to produce a DPSK demodulated signal.

As shown at a part (a) of FIG. 2, the DPSK modulated signal which is received at the terminal 1 is of a wave form whereby data of one bit is transmitted every period of time T. The signal (a) thus received is read into a shift register 2 according to a clock pulse signal (f) received at another input terminal 7.

Assuming that the period of the clock pulse signal (f) is t, the number N of bits of the shift register 2 is arranged to be $N = T/t (T > t)$. The DPSK modulated signal is thus arranged to be delayed by the shift register 2 as much as the period T. The output signal (b) of the shift register 2 which is as shown at a part (b) of FIG. 2 and the incoming DPSK modulated signal (a) are supplied to the EXOR 3, which produces its output as shown at a part (c) of FIG. 2. The signal (c) thus produced from the EXOR 3 is processed through the LPF 4 and becomes a demodulated signal which is as shown at a part (d) of FIG. 2. The wave form of the demodulated signal (d) is shaped into a DPSK demodulated signal as shown in a part (e) of FIG. 2.

However, in accordance with the conventional demodulation method, it is hardly possible to obtain a correct demodulated signal in the event that a part of the DPSK modulated signal is affected by a drop-out during transmission or by distorted transmission resulting in a wave form part X as shown in FIG. 2. In that event, the transmitted data might be mistaken depending on the timing for taking in the demodulated data. To avoid the adverse effect of such a drop-out or distorted transmission, it is conceivable to lower the cut-off frequency of the LPF 4. That methods, however, makes it impossible to shorten a data transmission period T required per bit and hinders high speed transmission of data. Further, in the event of demodulation of a DPSK modulated signal in which the transmission period of time per bit of data is varying, it becomes extremely difficult to determine the cut-off frequency of the LPF. Then, in that event, the probability of demodulating wrong data increases.

SUMMARY OF THE INVENTION

In view of the problem of the prior art mentioned above, it is an object of this invention to provide a differential phase shift keying demodulator which permits an increase in the data transmission speed.

It is another object of this invention to provide a differential phase shift keying demodulator which is capable of accurately and reliably carrying out demodulation.

Under this object, a differential phase shift keying demodulator arranged according to this invention comprises: delay means for delaying a signal modulated by differential phase shift keying; comparison means for comparing the output signal of the delay means and the modulated signal; and sampling means for sampling the output signal of the comparison means a plurality of times for the period of delay effected by the delay means.

It is a further object of this invention to provide a differential phase shift keying demodulator which is capable of reliably demodulating a signal modulated by differential phase shift keying even in the event that the transmission period of the signal per bit of data is varying.

Under that object, a differential phase shift keying demodulator arranged according to this invention to be capable of demodulating signals of different kinds which are modulated by differential phase shift keying and have a varying transmission period per bit of data comprises: delay means for delaying a signal modulated by differential phase shift keying; comparison means for comparing the signal delayed by the delay means with the modulated signal; and setting means for setting a delay time of the delay means relative to the output of the comparison means at one of different lengths of time corresponding to the transmission period of the modulated signal per bit of data.

These and further objects and features of this invention will become apparent from the following detailed description of preferred embodiments thereof taken in connection with the accompanying drawings.

BRIEF DESCRIPTION OF THE DRAWINGS

FIG. 1 is a diagram showing an example of the arrangement of the conventional differential phase shift keying demodulator.

FIG. 3 is a diagram showing the arrangement of a differential phase shift keying demodulator arranged according to this invention as an embodiment thereof.

FIG. 5 is a diagram showing the arrangement of a differential phase shift keying demodulator arranged as another embodiment of this invention.

DETAILED DESCRIPTION OF THE PREFERRED EMBODIMENTS

Figure 2:
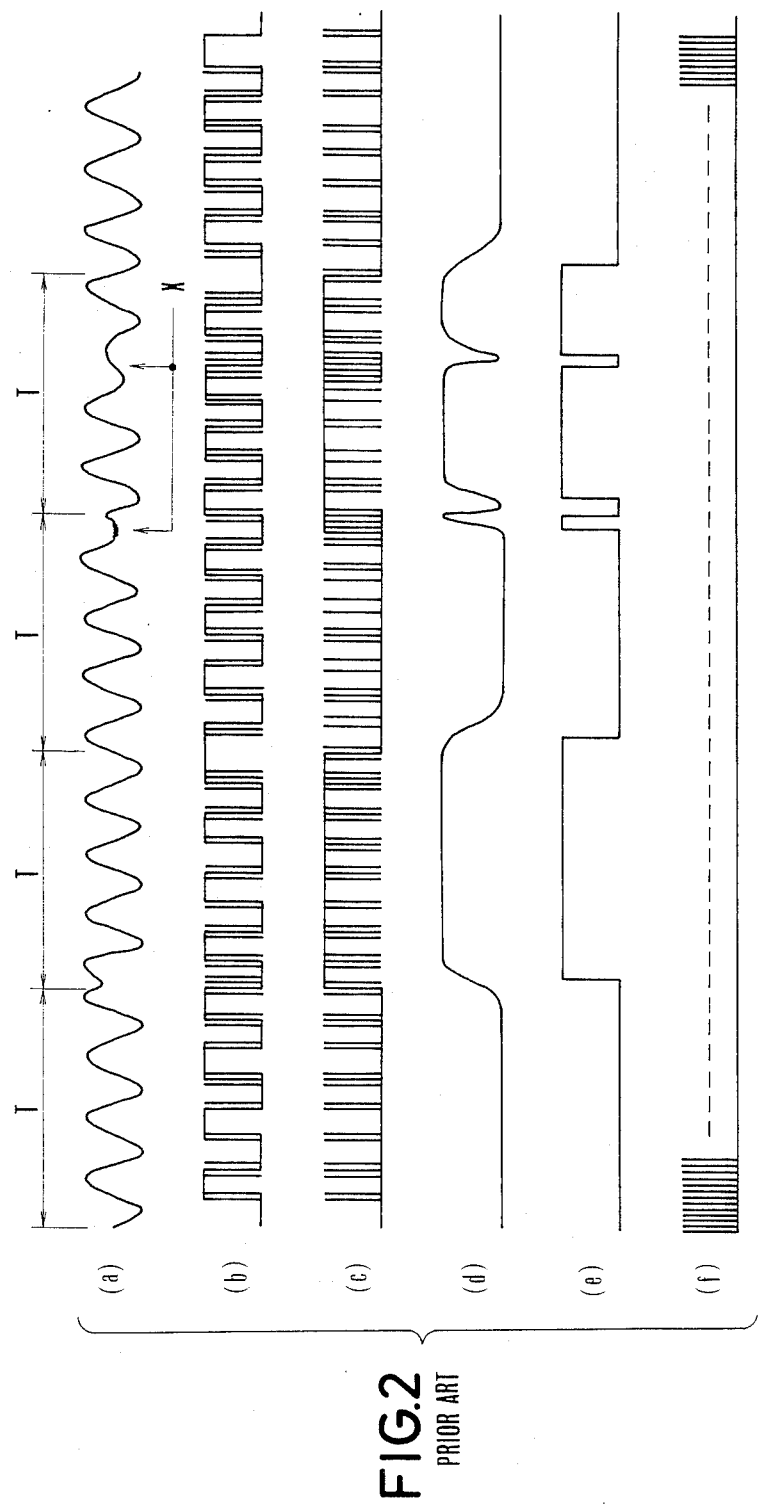
FIG. 2 is a timing chart showing the wave forms of signals obtained at various parts of FIG. 1.

Referring to FIG. 3 which shows a demodulator as an enbodiment of this invention, the illustration includes shift registers 2a and 2b; EXOR's 3a and 3b; D flip-flops 24, 13 and 14; an AND gate 25; a counter 26; a clock puse generator 7a; an output terminal 8 for producing DPSK demodulated data; a T flip-flop 9; an input terminal 10 for reference pulses; a timing signal generating circuit 11; and delay lines (hereinafter referred to as DL's) 12a and 12b obtained by the shift registers.

Figure 4:
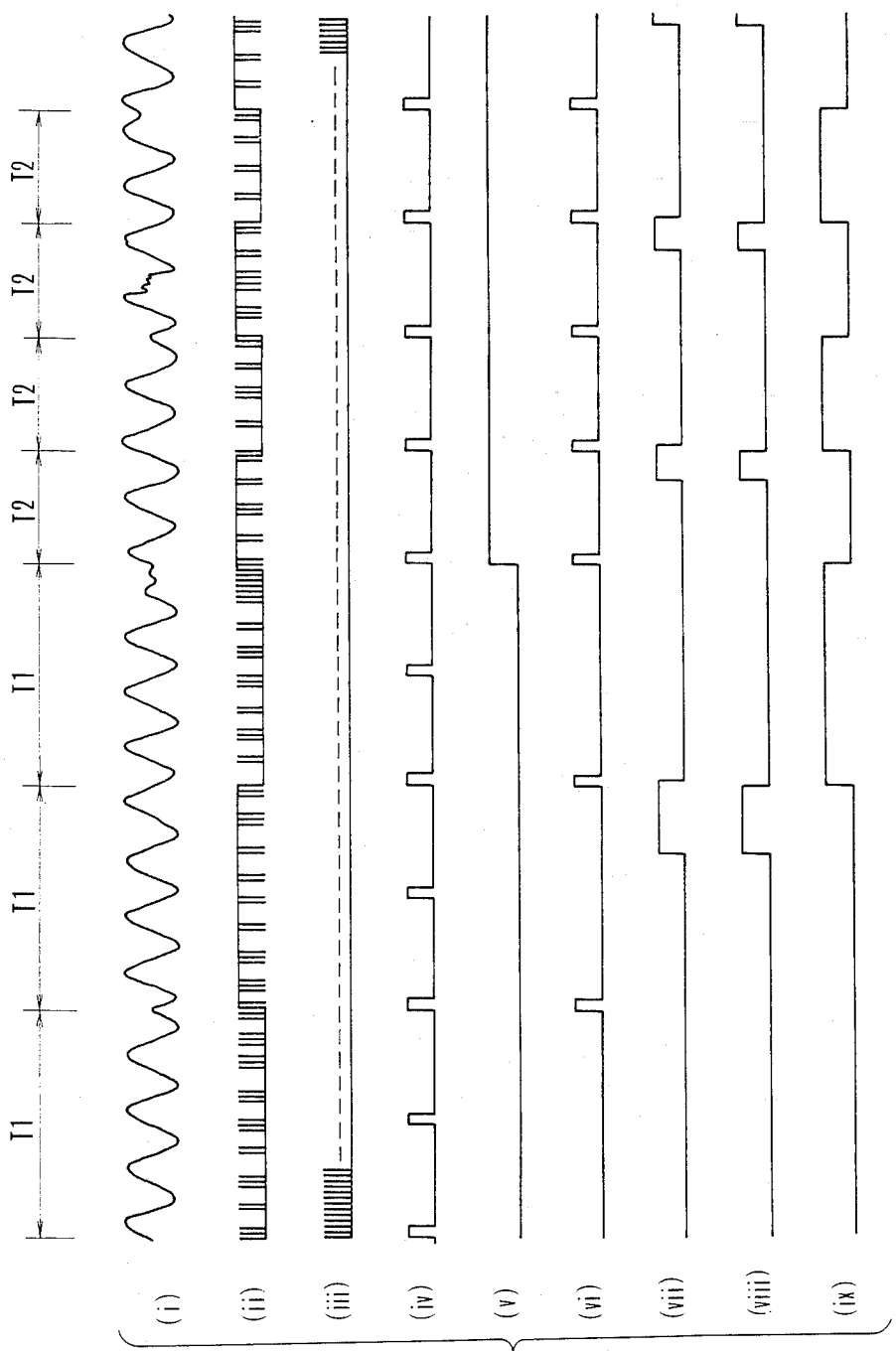
FIG. 4 is a timing chart showing the wave forms of signals obtained at various parts of FIG. 3.

The demodulator of this specific embodiment is arranged on the assumption that the one bit data transmission period of the DPSK modulated signal to be demodulated varies between two different periods T1 and T2 (T1=2T2) and that the numbers of data to be transmitted within these different transmission periods are predetermined respectively. This embodiment will be described in further details with reference to FIG. 3 and FIG. 4 which is a timing chart schematically showing the wave forms of signals obtained at the various parts of FIG. 3:

Let us assume that a DPSK modulated signal which is of a wave form as shown at a part (i) of FIG. 4 is supplied to the terminal 1 of FIG. 3. This signal is read into the shift register 2a according to a signal (iii) of a period t0 which is determined by frequency dividing the clock pulses produced from the clock pulse generator 7a by $\frac{1}{2}$ at the T flip-flop 9. In this instance, the period t0 is about 1/5 of the period of the carrier of the DPSK modulated signal.

The bit number N of each of the shift registers 2a and 2b is N = T2 / t0. The signal which passes through the shift registers 2a and 2b is delayed for a period T1 and the signal which passes through only the shift register 2a for a period T2. The output signal of the shift register 2a is supplied to the EXOR 3b and that of the shift register 2b to the EXOR 3a respectively. The EXOR 3a and 3b are also receiving the incoming DPSK modulated signal (i) directly from the terminal 1 as it is.

The output terminals of the EXOR 3a and 3b are respectively connected to the termianls A and B of a switch SW1. The connecting position of the switch SW1 is shifted by the output signal of the DL 12a. The reference pulse signal shown at a part (iv) in FIG. 4 is of a period equal to the shorter one bit data transmitting period T2 of the DPSK modulated signal. The reference pulse signal (iv) is supplied to the timing signal generating circuit 11. The timing signal generating circuit 11 counts the number of the transmitted data of the DPSK modulated signal by counting the reference pulses of the signal (iv). In other words, the timing signal generating circuit 11 is arranged to produce a signal (v) which changes from a low level to a high level when a preset number of data of the DPSK modulated signal has been received at the terminal 1 during the transmission period T1. Then, this signal (v) which is as shown at a part (v) of FIG. 4 controls the switch SW1 via the DL 12a. The data transmission period is T1 when the signal (v) is at a low level and is T2 when the signal is at a high level. The switch SW1 is connected to the terminal A when the signal (v) is at the low level and to the other terminal B when the signal is at the high level. The details of the DL's 12a and 12b will be described later herein.

The output signal of the switch SW1 is as shown at a part (ii) of FIG. 4. The signal from the switch SW1 is supplied to the D terminal of a D flip-flop (hereinafter referred to as DFF) 24. The DFF 24 takes in data at a rise of the clock pulse signal produced from the clock pulse generator 7a and produces a Q output. The output of the DFF 24 is supplied to an AND gate 25. When the output of the DFF 24 is at a high level, the AND gate 25 gates the clock pulse signal. The clock pulses thus gated are counted by a counter 26.

The counter 26 is arranged to be cleared by a periodic signal (vi) which is generated from the timing signal generating circuit 11 and corresponds to the data transmission period as shown at a part (vi) of FIG. 4. Therefore, the counter 26 is thus allowed to count a number of clock pulses gated during the one-bit-data transmission period. The counter 26 produces a Q1 output at a high level when the counted number of clock pulses is q1 and a Q2 output at a high level when the counted number is q2. In this instance, if the period of the clock pulses is t0/2, the number q1 is arranged to be T1 / t0 and the number q2 to be T2 / t0. The Q1 and Q2 output terminals of the counter 26 are respectively connected to the terminals A and B of a switch SW2. The connecting position of the switch SW2 is arranged to be on the side of the terminal A when the data transmission period is T1 and on the side of the other terminal B when the data transmission period is T2 in the same manner as the switch SW1. The output signal of the switch SW2 is as shown at a part (vii) in FIG. 4. As apparent from FIG. 4, in the event of a high degree of probability that the output (ii) of the switch SW1 is at a high level during each data transmission period, the level of the output of the switch SW2 becomes high before the end of each data transmission period. Further, in the case of a high probability that the output (ii) of the switch SW1 is at a high level during each data transmission period, the data transmitted by the DPSK modulated signal is also at a high level.

The output signal (vii) of the switch SW2 is supplied to the clock terminal of the DFF 13. The DFF 13 is arranged to be triggered by a rise of the output signal of the switch SW2 and to be cleared by the signal (vi) which is produced from the timing signal generating circuit 11 and represents the data transmission period. The Q output (viii) of the DFF 13 which is as shown at a part (viii) in FIG. 4 is supplied to the D terminal of the DFF 14 and is retained for the one-bit-data transmission period according to the signal (vi). The output signal (ix) of the DFF 14 which is as shown at a part (ix) in FIG. 4 becomes data which is obtained by demodulating the DPSK modulated signal. The clearing timing of the DFF 13 is later than the data retaining timing of the DFF 14.

Further, the DL's 12a and 12b are arranged as follows: Let us assume that the reference pulse signal (iv) is FM modulated at a frequency higher than the frequency of the DPSK modulated signal and is recorded on a magnetic sheet with the DPSK modulated signal frequency multiplexed therewith. In demodulating the DPSK modulated signal reproduced from the magnetic sheet, the DPSK modulated signal is separated from the FM modulation wave component of the reference pulse signal by means of a filter. However, the DPSK modulated signal is of a lower frequency. Therefore, in separating it, a long delay time is required by the filter. As a result, there arises a time lag as compared with the reproduced reference pulse signal. The DL's 12a and 12b are provided for the purpose of compensating for this time lag. Each boundary between one data transmission period and another thus can be made to coincide with each rising point of the reference pulse signal.

With the embodiment arranged as described above, any poor S/N ratio portion of the signal due to a drop-out or transmission distortion occurred during one data transmission period results merely in a slight change of the number of clock pulses received at the counter 26. Even in the event of a drop-out covering nearly half of one data transmission period, the data can be reliably demodulated. Further, in cases where there are two or more than two different data transmission periods, the data can be adequately processed by just increasing the number of the output terminals of the counter 26. Further, the data transmission period per bit can be readily shortened for an increased speed of data transmission.

Since no analog time constant circuit, such as an LPF, etc., is employed, the embodiment obviates the necessity of adjusting any circuit constant. Besides, the embodiment is advantageous in terms of use of an IC.

The delay time of the DL's 12a and 12b can be accurately determined by means of the clock pulses. Therefore, the embodiment is advantageously applicable to a transmission system of the kind having reference pulses superimposed on some different zone.

FIG. 5 shows the arrangement of a demodulator as another embodiment. The same components as those shown in FIG. 3 are indicated with the same reference numerals and the details of them are omitted from the following discription: A shift register arrangement 2 consists of the same number of shift registers as the shift registers 2a and 2b of the preceding embodiment shown in FIG. 3. The output of a T flip-flop 9 or the output of a T flip-flop 16 which is obtained by ½ frequency dividing the output of the T flip-flop 9 is selectively applied through a switch SW3 to the shift register 2 as a driving signal. In other words, the signal delaying time of the shift register 2 is shifted from one value to another by thus changing the frequency of the driving signal. Therefore, in accordance with the arrangement of the modulator of FIG. 5, demodulation can be accomplished in the same manner as in the case of FIG. 3.

In each of the embodiments described, the counter 26 is arranged to have a plurality of output terminals according to the numbers to be counted according to changes in the above-stated delay time. However, this arrangement may be replaced with some arrangement to change the frequency of the clock pulses to be supplied to the AND gate 25.

What is claimed is:

1. A differential phase shift keying demodulator comprising:
   (a) delay means for delaying a signal modulated by differential phase shift keying;
   (b) comparison means for comparing the output signal of said delay means and said modulated signal obtained without being delayed; and
   (c) sampling means for sampling the output signal of said comparison means a plurality of times for the period of delay effected by said delay means.

2. A demodulator according to claim 1, further comprising clock pulse generating means for generating a clock pulse signal.

3. A demodulator according to claim 2, wherein said sampling means is arranged to perform sampling by using said clock pulse signal.

4. A demodulator according to claim 3, wherein said delay means includes a shift register.

5. A demodulator according to claim 4, wherein said shift register is arranged to be driven by means of said clock pulse signal.

6. A demodulator according to claim 3, further comprising adjusting means for adjusting the timing of sampling by said sampling means according to the timing of data transmission by said modulated signal.

7. A demodulator according to claim 1, wherein the data transmission period per bit by said modulated signal is equal to the delay period of said delay means.

8. A demodulator according to claim 7, further comprising means for restoring to its original state a signal obtained by demodulating said modulated signal on the basis of the output of said sampling means produced within a period during which one bit of data is transmitted through said modulated signal.

9. A demodulator according to claim 8, wherein said comparison means includes an exclusive OR circuit which is arranged to receive the output signal of said delay means and said modulated signal.

10. A demodulator according to claim 8, wherein said sampling means includes an AND gate which is arranged to receive the output signal of said comparison means as a signal to be sampled.

11. A demodulator according to claim 10, wherein said restoring means includes detecting means which, for every period during which one bit of data is transmitted by said modulated signal, detects that the number of sampling signals produced from said AND gate reaches a predetermined number.

12. A demodulator according to claim 11, wherein said restoring means further includes means for sampling and holding the output signal of said detecting means produced within the period during which one bit of data is transmitted by said modulated signal.

13. A differential phase shift keying demodulator capable of demodulating signals of different kinds which are modulated by differential phase shift keying and have a varying transmission period per bit of data, comprising:
   (a) delay means for delaying a signal modulated by differential phase shift keying;
   (b) comparison means for comparing said signal delayed by said delay means with said modulated signal; and
   (c) setting means for setting a delay time of said delay means relative to the output of said comparison means at one of different lengths of time corresponding to the transmission period of said modulated signal per bit of data.

14. A demodulator according to claim 13, wherein said delay means includes shift register means.

15. A demodulator according to claim 14, wherein said setting means includes change-over means for shifting the number of register stages of said shift register means relative to to the output of said comparison means from one number of stages to another.

16. A demodulator according to claim 15, wherein said shift register means includes series connected two shift registers; and said comparison means includes a first comparison circuit which compares the input signal of said series connected two shift registers with the output signal thereof and a second comparison circuit which compares the input signal of one of said two shift registers with the output signal thereof.

17. A demodulator according to claim 16, wherein said change-over means includes a switch circuit which is arranged to selectively produce, as the output signal of said comparison means, either the output signal of said first comparison circuit or the output signal of said second comparison circuit.

18. A demodulator according to claim 14, wherein said setting means includes frequency change-over means for shifting the frequency of a clock pulse signal to be used for driving said shift register means.

* * * * *

UNITED STATES PATENT AND TRADEMARK OFFICE
CERTIFICATE OF CORRECTION

PATENT NO. : 4,746,872

DATED : May 24, 1988

INVENTOR(S) : Shigeo Yamagata

It is certified that error appears in the above-identified patent and that said Letters Patent is hereby corrected as shown below:

Item [22] change "May 19, 1988" to -- May 19, 1986 --.

Signed and Sealed this

Eighteenth Day of January, 2000

Attest:

Q. TODD DICKINSON

Attesting Officer

Commissioner of Patents and Trademarks